(12) United States Patent
Jeon

(10) Patent No.: US 9,447,845 B2
(45) Date of Patent: Sep. 20, 2016

(54) ANTI-BACKDRIVE ACTUATOR ASSEMBLY

(71) Applicant: Dura Operating LLC, Auburn Hills, MI (US)

(72) Inventor: Jinseok Jeon, LaSalle (CA)

(73) Assignee: Dura Operating, LLC, Auburn Hills ( * ) Notice: Subject to any disclaimer, the term of this patent is extended or adjusted under 35 U.S.C. 154(b) by 59 days.

(21) Appl. No.: 14/272,550

(22) Filed: May 8, 2014

(65) Prior Publication Data

US 2015/0323042 A1 Nov. 12, 2015

(51) Int. Cl.
*F16H 35/00* (2006.01)
*F16H 1/00* (2006.01)
*F16H 1/28* (2006.01)

(52) U.S. Cl.
CPC ............... *F16H 1/00* (2013.01); *F16H 1/003* (2013.01); *F16H 1/28* (2013.01)

(58) Field of Classification Search
CPC ... F16H 1/003; F16H 37/12; F16H 2035/005
See application file for complete search history.

(56) References Cited

U.S. PATENT DOCUMENTS

| 2,014,316 | A | * | 9/1935 | Farrell ..................... 192/223.2 |
| 3,774,477 | A | * | 11/1973 | Murphy ...................... 475/337 |
| 4,295,552 | A | * | 10/1981 | Erlach .................. F16D 41/206 |
| | | | | 192/81 C |
| 4,733,579 | A | | 3/1988 | Lew |
| 4,877,113 | A | | 10/1989 | Taig |
| 4,909,363 | A | | 3/1990 | Trommer |
| 5,695,425 | A | | 12/1997 | Hashimoto et al. |
| 6,769,527 | B1 | | 8/2004 | Paris |
| 7,311,190 | B2 | | 12/2007 | Diez-Martinez Cervantes |
| 7,861,840 | B1 | | 1/2011 | Dornan |
| 8,511,441 | B2 | | 8/2013 | Lang et al. |
| 8,591,367 | B2 | * | 11/2013 | Kochan ......................... 475/149 |
| 2001/0027146 | A1 | | 10/2001 | Spaziani et al. |
| 2004/0216981 | A1 | | 11/2004 | Acosta |
| 2010/0210391 | A1 | * | 8/2010 | Dinger .................... B64C 13/28 |
| | | | | 475/149 |
| 2011/0092332 | A1 | * | 4/2011 | Evenson ....................... 475/168 |
| 2013/0172139 | A1 | * | 7/2013 | Todd et al. ....................... 475/1 |
| 2013/0184112 | A1 | | 7/2013 | Choi et al. |
| 2013/0206530 | A1 | | 8/2013 | Adams |

OTHER PUBLICATIONS

Written Opinion & International Search Report for PCT/US2015/029700 dated Aug. 12, 2015, 11 pages.

\* cited by examiner

*Primary Examiner* — Sherry Estremsky
*Assistant Examiner* — Lillian Nguyen
(74) *Attorney, Agent, or Firm* — Reising Ethington P.C.; Matthew J. Schmidt; Robert E. Ford

(57) ABSTRACT

An actuator assembly may include a drive, a gear set coupled with the drive, an interface member coupled to the gear set, and an output coupled to the interface member. In at least one position of the interface member the gear set binds to prevent backdrive of the output.

20 Claims, 5 Drawing Sheets

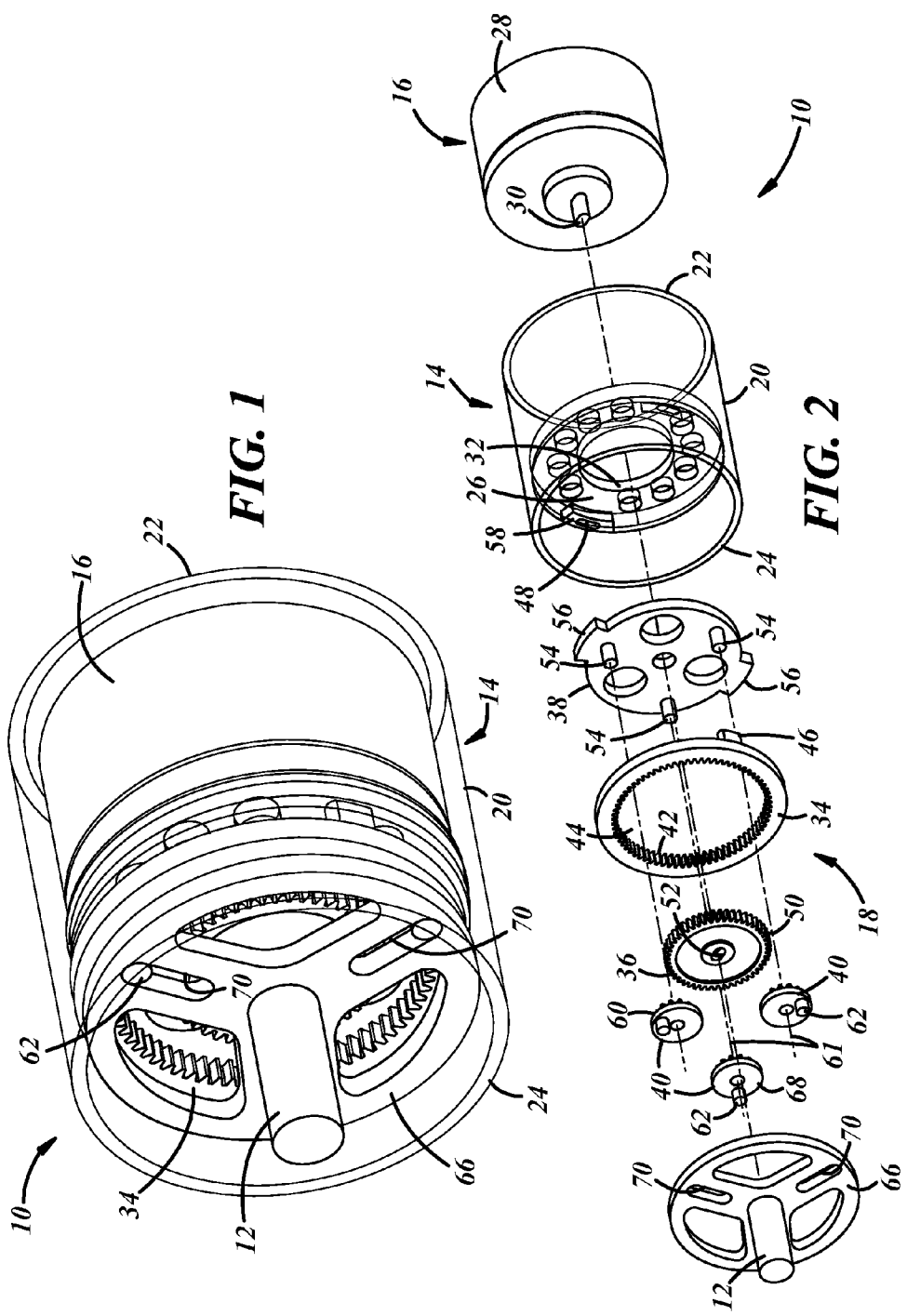

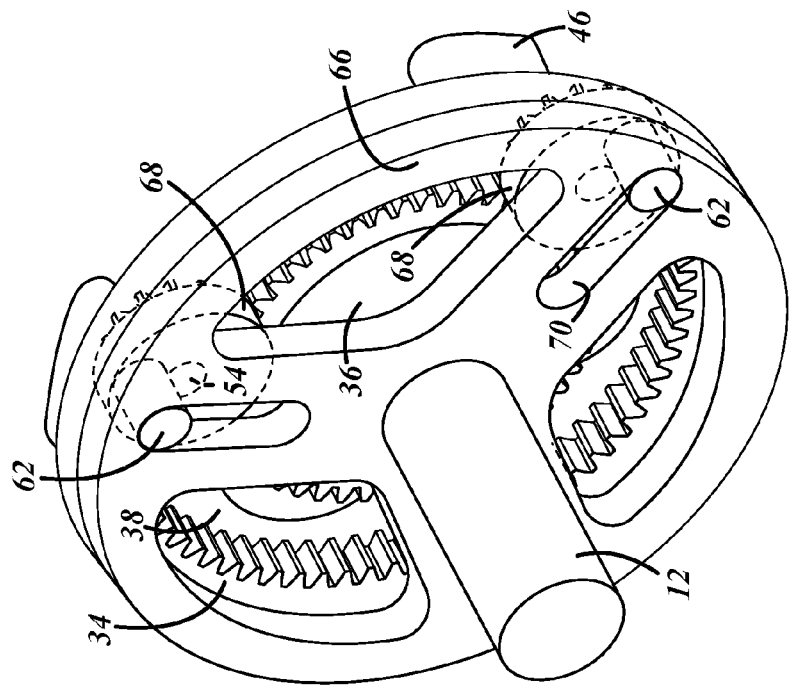
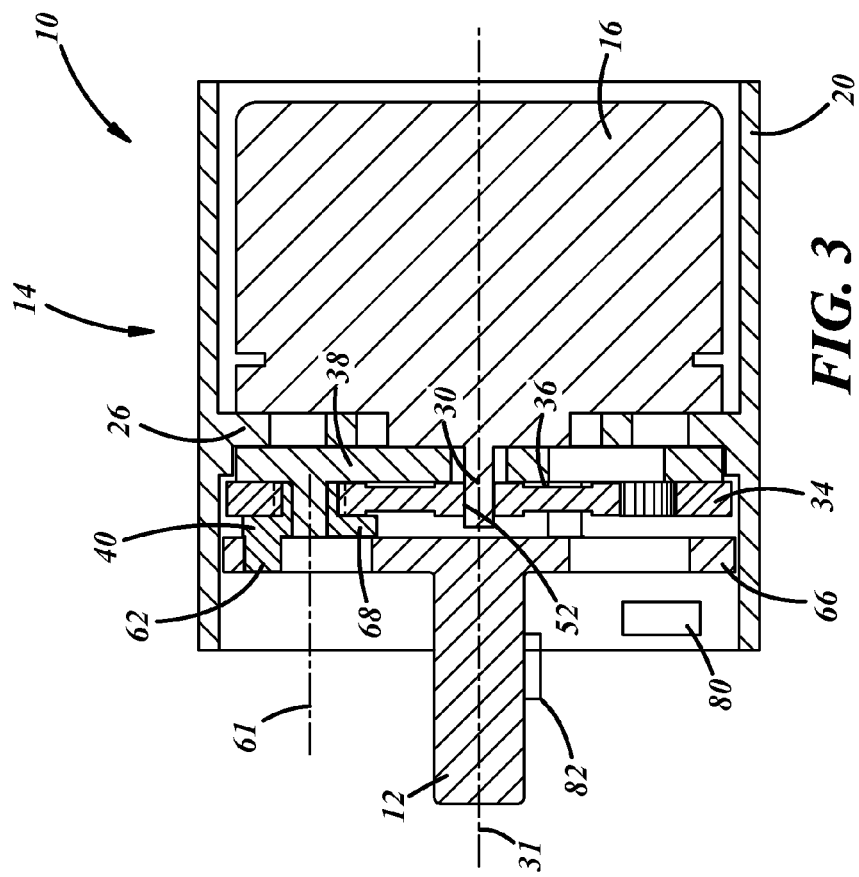
FIG. 4
FIG. 3

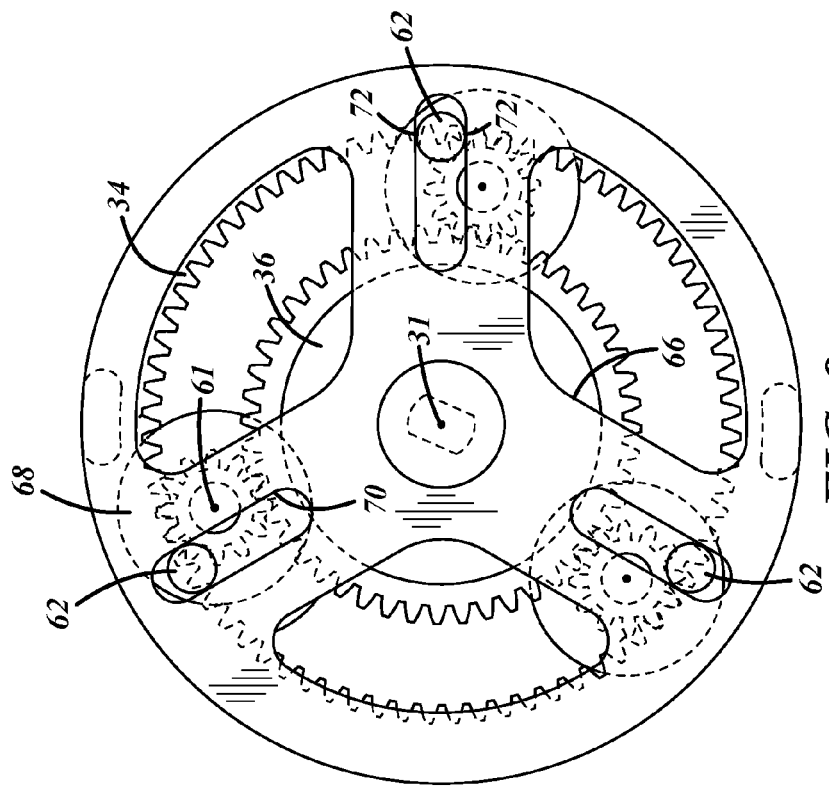
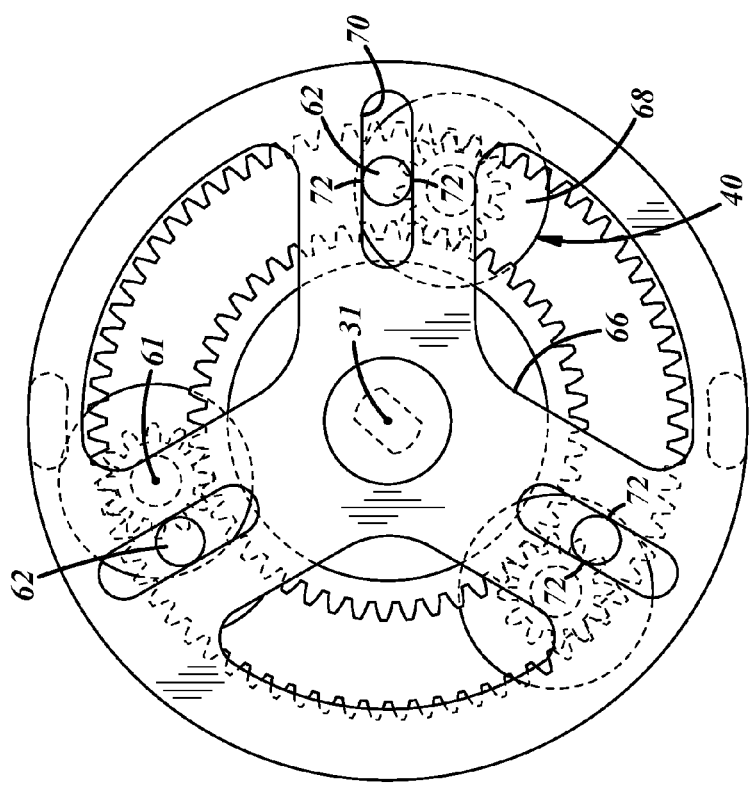

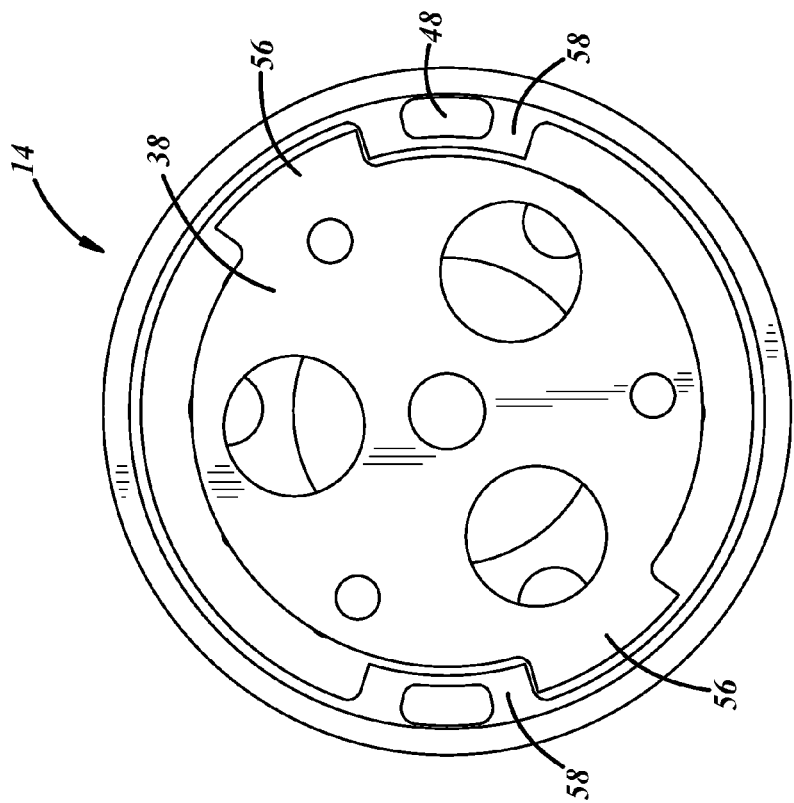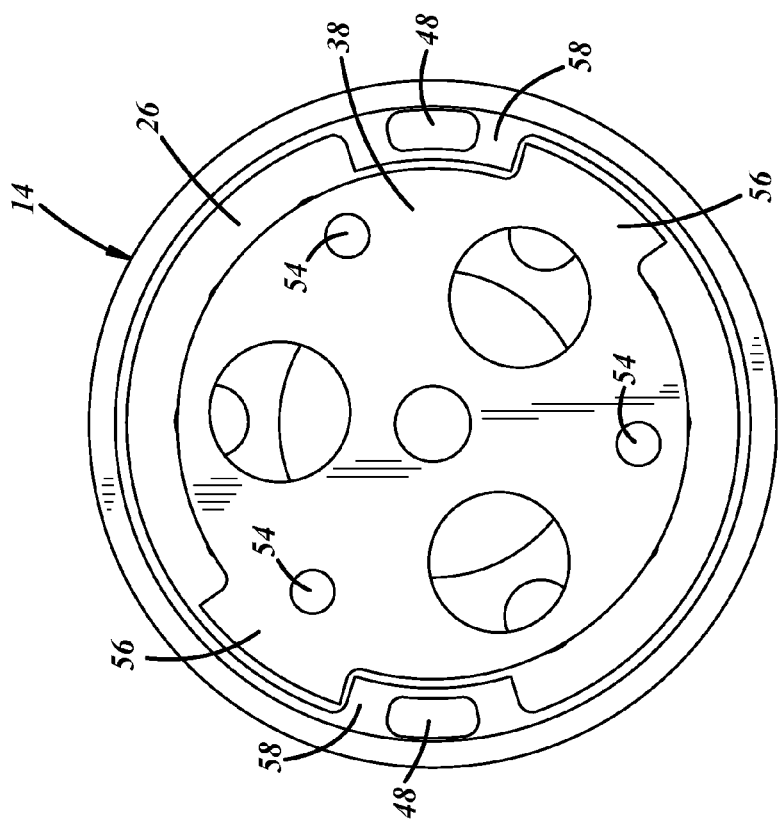

US 9,447,845 B2

ANTI-BACKDRIVE ACTUATOR ASSEMBLY

TECHNICAL FIELD

The present disclosure relates to an actuator assembly, and more particularly to an actuator assembly that selectively prevents backdrive of an output.

BACKGROUND

Actuators may be used to rotate an output shaft and the output shaft may in turn displace or drive a device to change position (including angular position). Backdrive may occur wherein the output shaft is rotated unintentionally. In some applications, backdrive is not acceptable and the position of the device needs to be maintained. To prevent backdrive, some devices have used clutches or brakes, but those things add cost and complexity to the system.

SUMMARY

In at least some implementations, an actuator assembly may include a drive, a gear set coupled with the drive, an interface member coupled to the gear set, and an output coupled to the interface member. In at least one position of the interface member the gear set binds to prevent backdrive of the output.

An actuator assembly in at least some implementations includes a ring gear, a sun gear having an axis, and a planet gear meshed with the sun gear and the ring gear and adapted to rotation about an axis. A drive member may be offset from the planet gear axis of rotation, and a carrier is provided on which the planet gear is mounted. The planet gear rotates relative to the carrier about the planet gear axis of rotation and rotates with the carrier about an axis of the carrier. An interface member may be engaged with the drive member and moved by the drive member during at least a portion of the movement of the drive member. And an output may be coupled to the interface member to move with the interface member. The drive member moves relative to the interface member as the planet gear rotates and in at least one position of the drive member relative to the interface member a backdrive movement of the output is prevented.

Other embodiments can be derived from combinations of the above and those from the embodiments shown in the drawings and the descriptions that follow.

BRIEF DESCRIPTION OF THE DRAWINGS

The following detailed description of preferred implementations and best mode will be set forth with regard to the accompanying drawings, in which:

FIG. 1 is a perspective view of an actuator assembly;

FIG. 2 is an exploded view of the actuator assembly of FIG. 1;

FIG. 3 is a sectional view of the actuator assembly;

FIG. 4 is a perspective view of a planetary gear set, an interface member and an output shaft of the actuator assembly;

FIGS. 5-8 are plan views of the planetary gear set shown in different positions; and FIGS. 9 and 10 are example plan views showing engagement of stops on a carrier with stop surfaces on a housing to limit rotary positions of the actuator assembly.

DETAILED DESCRIPTION OF PREFERRED EMBODIMENTS

Figure 6:
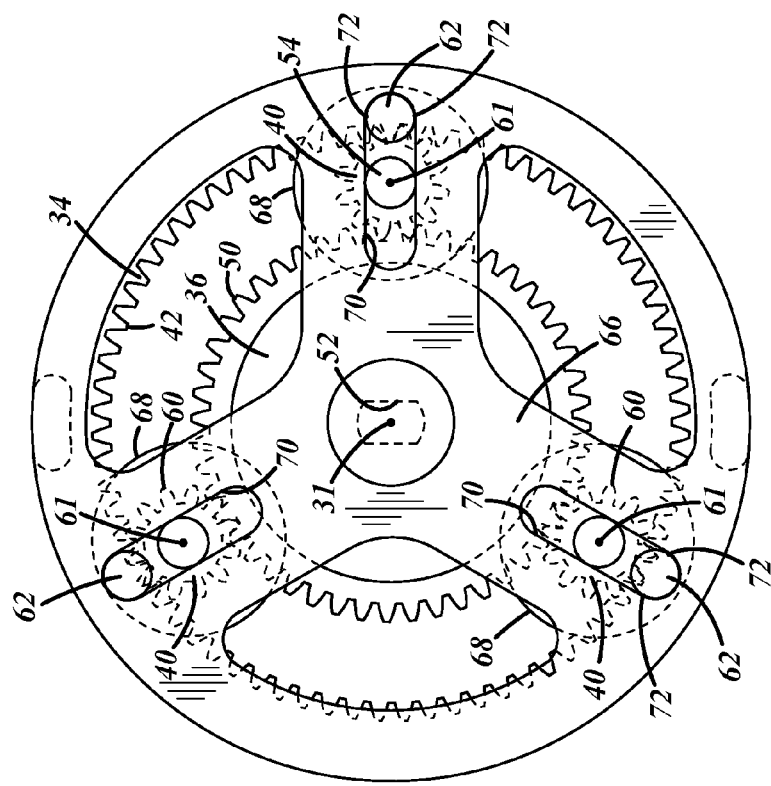

Referring in more detail to the drawings, FIGS. 1-3 illustrate an actuator assembly 10 having an output which may be or include an output shaft 12 that is rotated to move a device, and to selectively prevent the device from backdriving the actuator assembly. The term "backdrive" is intended to mean that the device rotates the actuator assembly, in other words, the output drives the input rather than the other way around. The device driven by the actuator assembly 10 may include a cam, gear or something else, and the movement may be continual in the forward direction, forward and reverse or in discrete segments of movement back-and-forth in forward and reverse between two or more positions, as desired. The actuator assembly 10 may be used with a wide range of devices with one example being a gear selector for an automotive transmission where rotation of the assembly causes rotation of a gear selector to change the selected and engaged transmission gear (e.g. among park, neutral, reverse and drive gears). In this example, where a backdrive rotation might result in an unwanted gear change, backdrive should be prevented. Another example where the actuator assembly may be used is for a device that facilitates switching between two wheel and four wheel drive gears.

The actuator assembly 10 includes a housing 14, a main drive 16, a gear set 18 driven by the main drive 16 and the output shaft 12. The housing 14 may contain all or most of the other components of the actuator assembly 10 to provide a compact, self-contained assembly, if desired. In the implementation shown, the housing 14 includes a generally cylindrical body 20 having ends 22 and 24, and an interior support 26 to facilitate locating and mounting various components in the housing 14, as will be described in greater detail below.

The main drive 16 may be provided within the housing 14 and include any device capable of driving for rotation the gear set 18. In the implementation shown, the main drive 16 includes an electric motor 28 that rotates a drive shaft 30 about a main axis 31 (FIGS. 3, 5-8) of the assembly. The motor 28 is located on one side of the housing support 26, and at least some of the gears of the gear set 18 are located on the opposite side of the support 26. In the implementation shown, all of the gears are on the opposite side of the support 26 as the motor 28 and the drive shaft 30 extends through an opening 32 of the support 26 to engage and drive at least one of the gears. The motor 28 may rotate the drive shaft 30 in one or both directions (clockwise, counter-clockwise), as desired.

The gear set 18 operably couples the motor 28 to the output shaft 12, so that rotation of the drive shaft 30 by the motor 28 causes rotation of the output shaft 12. In the implementation shown, the gear set 18 includes a planetary gear set 18. The planetary gear set 18 includes a ring gear 34, a sun gear 36, a carrier 38 and one or more planet gears 40 carried by the carrier 38. The planetary gear set 18 may be coupled between the drive shaft 30 and output shaft 12 in several configurations. The configuration shown and described in detail herein provides the ring gear 34 fixed against rotation and the sun gear 36 directly driven by the drive shaft 30. The sun gear 36 or carrier 38 could also be held or fixed against rotation with other modifications as may be appreciated from this disclosure.

In at least some implementations, the ring gear 34 is annular, has a central axis aligned with the main axis 31 of the assembly and includes radially inwardly facing teeth 42 that circumscribe an opening 44. To hold the ring gear 34 against rotation, the ring gear 34 includes a tab 46 that abuts one or more surfaces in the housing 14. As shown, the tab 46 extends outwardly from the ring gear 34 and is received in a complementary pocket 48 in the support 26. In alternative embodiments, more than one tab 46 and pocket 48 may be provided, or different structures may be provided to hold the ring gear 34 against rotation. By way of one non-limiting example, the ring gear could be formed as part of the housing rather than as a separate component.

In at least some implementations, the sun gear 36 is coaxially aligned with and received within and the ring gear 34. The sun gear 36 may include outwardly facing teeth 50 and a drive shaft receiving opening 52 that that permits the sun gear 36 to be driven for rotation by the drive shaft 30 about the axis 31. The sun gear 36 could be coupled to and driven by the drive shaft 30 in any suitable arrangement and may have any desired number of teeth 50.

The carrier 38 as shown is located generally between the ring gear 34 and the support 26 within the housing 14. In the implementation shown, the carrier 38 at least partially overlaps the ring gear 34 and includes an axle 54 for each of the planet gears 40. The axles 54 extend axially from the carrier 38, away from the support 26 and into the ring gear opening 44, spaced radially from the ring gear teeth 42. The carrier 38 may also carry one or more stops 56 adapted to engage an adjacent surface (e.g. of the housing 14) to limit rotation of the carrier 38 about axis 31 and relative to the housing 14. In the example shown, the carrier 38 includes a pair of stops 56, and the support 26 includes one or more stop surfaces 58 arranged to engage the stops 56 to limit rotation of the carrier 38 in both directions. That is, the carrier 38 is permitted to rotate in both directions a limited amount, until a stop 56 engages a stop surface 58. This provides discrete positions of the actuator assembly 10 which may help to control rotation of the device driven by the actuator assembly 10, and/or ensure defined positions for the device.

One or more planet gears 40 may be mounted on axles 54 of the carrier 38, and in the implementation shown, there are three axles 54 and three planet gears 40. Each planet gear 40 may include outwardly extending teeth 60 adapted to engage both the ring gear teeth 42 and the sun gear teeth 50. The axles 54 may be equally radially spaced from the axis of rotation of the ring and sun gears 34, 36, and the planet gears 40 may all be of the same size and are equally spaced apart circumferentially. Each planet gear 40 may rotate about an axis 61 defined by its respective axle 54 and the planet gears 40 may also rotate with the carrier 38 about its axis, which may be aligned with the axis of the ring and sun gears 34, 36.

At least one and up to each planet gear 40 is coupled with or carries a drive member 62. The drive member 62 is not coaxial with the planet gear 40 and is instead eccentrically mounted on or otherwise coupled to the planet gear 40. In the implementation shown, each planet gear 40 includes a pin that defines the drive member 62. The pins may extend axially outwardly from the planet gears 40 toward the output shaft 12 and are adapted to engage an interface member 66 that is coupled to the output shaft 12. In the implementation shown, the planet gears 40 include a flat and circular body 68 from which the drive member 62 extends axially off one side and the teeth 60 extend off the other side. Of course, the planet gear 40 may have any desired construction and arrangement.

The interface member 66 may be any member that is driven for rotation by engagement with the drive members 62 and is coupled to the output shaft 12 to move the output shaft 12. In the implementation shown, the interface member 66 is fixed to the output shaft 12 and is a generally flat disc with slots 70, each of which receives a drive member 62. The interface member 66 may rotate about an axis that is aligned with the axis 31 of the ring and sun gears 34, 36 and the slots 70 may extend radially relative to that axis and be angularly spaced apart to align with the planet gears 40. The slots 70 may extend from a location between the axis of rotation 31 of the interface member 66 and the axis of rotation 61 of the corresponding planet gear 40 (e.g. the planet gear 40 that carries the drive member 62 received within that slot 70) to a location beyond the pitch radius of that planet gear 40. Instead of or in addition to the stops 56 on the carrier 38, one or more stops may be provided on the interface member 66 to limit rotation in one or both directions. In use, in at least certain implementations, the drive member 62 moves within the slot 70 between a first position between the axis of rotation 31 of the interface member 66 and the axis of rotation 61 of the corresponding planet gear 40 and a second position beyond or outboard of the pitch radius of the planet gear, as will be described in more detail below.

The output shaft 12 may be any component(s) arranged to be driven by the gear set 18 and interface member 66 and to be coupled to a device to drive the device. In the implementation shown, the output shaft 12 is cylindrical and fixed to the interface member 66 at one end, and coaxial with the interface member 66, carrier 38, sun gear 36 and ring gear 34. The opposite end of the output shaft 12 may extend out of the housing 14 or be otherwise accessible for coupling to the device to be driven by the actuator assembly 10.

In use of the actuator assembly 10 as illustrated, the motor 28 rotates the drive shaft 30 which rotates the sun gear 36. Rotation of the sun gear 36 causes rotation of the planet gears 40. Because the ring gear 34 is fixed against rotation, rotation of the planet gears 40 causes rotation of the carrier 38. Rotation of the planet gears 40 also moves the drive members 62 within the slots 70 and relative to the interface member 66. The combined rotation of the planet gears 40 about their axes 61 and the carrier 38 about its axis 31 causes the drive members 62 to engage the interface member 66 within the slots 70 and rotate the interface member 66. The drive members 62 and slots 70 are arranged so that the drive members 62 work together to rotate the interface member 66 and the gears and interface member 66 do not bind or interfere with each other in normal operation. In one form, the drive members 62 are maintained equidistant from the axis 31.

The output shaft 12 and the interface member 66 may rotate as much as desired, or until a stop 56 engages a stop surface 58 (if stops and stop surfaces are provided). FIGS. 9 and 10 illustrate the stops 56 hitting opposite stop surfaces 58 in the housing, limiting rotation in each direction. The output shaft 12 and the interface member 66 may also rotate in the opposite direction, and may do so as much as desired or until a stop 56 engages a stop surface 58 (if provided). The output shaft 12, interface member 66, carrier 38 and sun gear 36 all rotate in the same direction while the planet gears 40 rotate about their axes 61 in the opposite direction.

Figure 5:
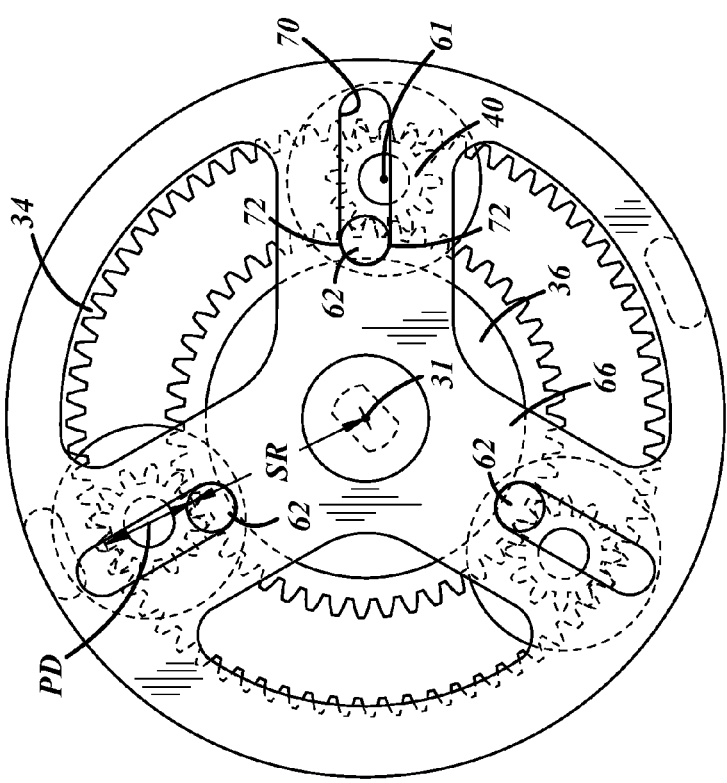

As noted above, during rotation of the interface member 66, the drive members 62 move radially within the slots 70. As shown in FIGS. 5 and 6, the drive members 62 may move from a first position at or near a radially inner end of the slots 70 (FIG. 5) to a second position at or near a radially outer end of the slots 70 (FIG. 6). In the first position, each drive member 62 is located between the axis of rotation 31 of the interface member 66 and the axis of rotation 61 of its corresponding planet gear 40. In the second position, each drive member 62 is located further radially away from the axis of rotation 31 of the interface member 66 and radially outwardly of the pitch radius of its corresponding planet gear 40. When the planet gears 40 have less teeth than the sun gear 36, the planet gears 40 may rotate more than once about their axles 54 for each revolution of the sun gear 36. Therefore, when that is true, the drive members 62 may travel back-and-forth multiple times between the first and second positions as the gears rotate. It may be considered that the drive members 62 move one stroke for each revolution of the planet gears 40, in which case the drive members 62 move more than one stroke for each revolution of the sun gear 36. Of course, the sun gear need not rotate once. The sun gear can rotate less than once or more than once, and the sun gear may have the same as, fewer than or more teeth than the planet gears, as desired.

In at least some positions of the drive members 62 within their slots 70, rotation of the output shaft 12, in either direction, that would cause rotation of the gear set 18 (e.g. backdrive) is prevented. In implementations where the output is not rotated but is otherwise moved, or is both rotated and otherwise moved, the backdrive movement and/or rotation may be prevented. This may be desirable to ensure that the device driven by the actuator assembly 10 is not unintentionally moved out of a desired position during normal use, or during a loss of power, and this may hold the device in a particular position. In this example, backdrive is prevented when the area of engagement 72 of the drive members 62 with the interface member 66 is at a distance from the axis 31 that is equal to or greater than the sun gear pitch radius ('SR' in FIG. 5) plus the planet gear pitch diameter ('PD' in FIG. 5). Stated differently, backdrive is prevented when the area of engagement 72 of the drive member 62 is at or outside of the pitch radius of the ring gear 34, where "outside" means at a distance from the axis 31 that is greater than the ring gear pitch radius. The area of engagement 72 of the drive members 62 with the interface member 66 may be a point or larger surface area and is shown on both sides of the pins because the gears may rotate in both clockwise and counterclockwise directions, references to the area of engagement being at or outside of a radius may be taken to mean, in at least some implementations, that the center of the area of engagement 72 is at such location or distance. In FIGS. 4 and 6, the area of engagement 72 of the drive members 62 is at a distance from the axis 31 that is greater than the sun gear pitch radius SR plus the planet gear pitch diameter PD, and in FIG. 8 the area of engagement 72 of the drive members 62 is at a distance from the axis 31 that is about equal to (or slightly greater than) the sun gear pitch radius SR plus the planet gear pitch diameter PD. Backdrive is prevented in this situation because the torque generated by the output shaft 12 on the planet gears 40 (via the interface member 66 and drive members 62) is in the opposite direction as the planet gear 40 rotation that would be caused by the backdrive rotation of the output shaft 12. These opposing forces lock the assembly and prevent the backdrive rotation.

Conversely, when the area of engagement 72 of the drive members 62 is at a distance from the axis 31 that is less than the sun gear pitch radius SR plus the planet gear pitch diameter PD, such as shown in FIG. 5, the torque generated by the output shaft 12, during backdrive rotation of the output shaft 12, is in the same direction as the planet gear 40 rotation. The forces are not opposed in this instance, and backdrive rotation is permitted. Because the area of engagement 72 of the drive members 62 may be in position to prevent backdrive several times during rotation of the assembly, due to the gear ratio of the sun gear 36 and planet gears 40, there are several angular positions of the actuator assembly 10 where backdrive may be prevented, and likewise, several angular positions where backdrive may be permitted. Further, to prevent backdrive, the area of engagement 72 of the drive members 62 need not be aligned with a line or plane extending through both the axes 31 and 61, so long as the area of engagement 72 is at a distance equal to or greater than the specified distance, backdrive will be prevented. One example of this is shown in FIG. 8.

In an arrangement where the sun gear 36 is held against rotation and the ring gear 34 is permitted to rotate, a different position of the drive members 62 will prevent backdrive rotation of the output shaft 12. In this arrangement, backdrive rotation of the output shaft 12 will be prevented when the areas of engagement 72 of the drive members 62 are between the axis 31 and the sun gear pitch radius SR, or spaced from the axis a distance equal to the sun gear pitch radius SR and not outside of (e.g. still overlapping) the sun gear.

In both instances (when the ring gear is held against rotation and when the sun gear is held against rotation), it should be recognized that, due to friction and other forces tending to resist rotation of the gears (e.g. the motor provides at least some force that resists rotation) the backdrive rotation of the output shaft 12 may be prevented under the forces encountered in use when the drive members 62 are spaced from the positions indicated for backdrive prevention. That is, the forces tending to backdrive rotate the output shaft 12 may be effectively offset even when the drive members 62 are not in the stated positions. For example, the forces tending to backdrive rotate the output shaft 12 when the ring gear is held against rotation may be insufficient to actually rotate the output shaft even when the area of engagement 72 of the drive member 62 is outside of the sun gear pitch radius SR relative to the axis 31. Accordingly, this disclosure should be interpreted broadly enough to include any position where such backdrive rotation of the output shaft is prevented in the manner described herein (e.g. an orientation of the gears and drive members 62 relative to the interface member that is sufficient to prevent backdrive rotation in a given implementation).

Further, the eccentricity of the drive members 62 on the planet gears 40 may be varied. In general, less eccentricity effectively provides a lower torque force to prevent backdrive, and more eccentricity provides more torque force to better prevent backdrive. Engagement of the stops 56 and stop surfaces 58 may coincide with an angular position of the actuator assembly 10 that prevents backdrive, if desired. Although, as noted above, the backdrive prevention is not dependent upon engagement of the stops 56 and stop surfaces 58. A rotation sensor may be employed on any rotating portion of the assembly 10 to enable a controller to determine the angular position of one or more parts of the assembly (e.g. the output shaft 12). As shown diagrammatically in FIG. 3, a sensor 80 may be carried by the housing 14 and responsive to the angular position of the output shaft 12. Any suitable sensor may be used, and one example is a hall effect sensor where the output shaft 12 includes a magnet 82 that is rotated relative to the sensor.

Accordingly, the actuator assembly 10 provides controlled drive of an output (rotation of an output shaft 12 in at least some implementations) and can selectively prevent backdrive of the output. When the assembly is used in a vehicle transmission gear shifter application, the anti-backdrive feature may be desirable to hold the vehicle transmission in a particular gear as long as desired, and potentially even during a loss of power to the main drive 16 of the actuator assembly 10. Some systems utilize a worm gear drive to counter backdrive forces. But the worm gear is mounted perpendicular to the output shaft axis and the system occupies a relatively large space. Here, the sun, planets and ring gear 34 may be coplanar, with the carrier 38 and interface member 66 outside of that plane, providing a compact assembly that requires less space and may conveniently be contained in a housing with the motor.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. For example, there may be other planetary gear configurations that would require modifications to achieve the same functions and which will be readily understood by persons of ordinary skill in the art in view of this disclosure. Other gear sets may be included to, for example, adjust speed and/or torque as desired. For example without limitation, there can be more than one planetary gear stage to, for example, increase output torque and in such cases the drive members can be on the final stage of planetary gears. Relative location or orientation terms like upper, lower, side, top, bottom, left, right or the like are directed to the orientation of components in the drawings and are not intended to limit the invention unless expressly noted as such a limitation. It is contemplated that the components may be oriented and arranged in other ways.

The invention claimed is:

1. An actuator assembly, comprising:
   a ring gear;
   a sun gear having an axis;
   a planet gear meshed with the sun gear and the ring gear and configured to rotate about an axis of the planet gear;
   a drive member offset from the planet gear axis of rotation;
   a carrier on which the planet gear is mounted to rotate about the planet gear axis of rotation and to rotate with the carrier about an axis of the carrier;
   an interface member engaged with the drive member and moved by the drive member during at least a portion of the movement of the drive member; and
   an output coupled to the interface member to move with the interface member, wherein the drive member moves relative to the interface member as the planet gear rotates and in at least one position of the drive member relative to the interface member a backdrive movement of the output is prevented.

2. The actuator assembly of claim 1 wherein the interface member is engageable with the drive member at an area of engagement of the drive member and when the area of engagement of the drive member is located the same distance as or further away from the axis of the sun gear as the sun gear pitch radius plus the planet gear pitch diameter, then backdrive movement of the output is prevented.

3. The actuator assembly of claim 2 wherein the drive member is a pin carried by the planet gear and the interface member includes a slot that receives at least a portion of the pin, and rotation of the planet gear moves the pin within the slot and also engages the pin and interface member to rotate the interface member.

4. The actuator assembly of claim 3 wherein the slot extends radially relative to an axis of rotation of the interface member and the slot extends to a location outboard of the pitch radius of the planet gear.

5. The actuator assembly of claim 1 wherein the interface member is engageable with the drive member at an area of engagement of the drive member and when the area of engagement of the drive member is located closer to the axis of the sun gear than the sun gear pitch radius plus the planet gear pitch diameter, then backdrive movement of the output is permitted.

6. The actuator assembly of claim 1 wherein the interface member is rotated about an axis that is coaxial with the axis of the sun gear.

7. The actuator assembly of claim 6 wherein the output is rotated about an axis as the interface member rotates, and the axis of rotation of the output shaft is coaxial with the axis of rotation of the interface member.

8. The actuator assembly of claim 1 wherein multiple planet gears are provided each equally spaced from the axis of rotation of the carrier.

9. The actuator assembly of claim 1 which also comprises a main drive coupled to the sun gear to rotate the sun gear about an axis and wherein the ring gear is fixed against rotation so that the carrier rotates relative to the ring gear.

10. The actuator assembly of claim 1 wherein the interface member is engageable with the drive member at an area of engagement of the drive member and the area of engagement of the drive member is located at a distance relative to the axis of the sun gear that is less than the sun gear pitch radius plus the planet gear pitch diameter and backdrive movement of the output is prevented under forces experienced in use of the actuator assembly.

11. The actuator assembly of claim 1 wherein the sun gear is held against rotation and the interface member is engageable with the drive member at an area of engagement of the drive member, and when the area of engagement of the drive member is located the same distance as or closer to the axis of rotation of the carrier as the sun gear pitch radius, then backdrive movement of the output is prevented.

12. The actuator assembly of claim 1 which also includes a position sensor operable to determine at least one position of at least one of the gears, carrier, interface member or output.

13. An actuator assembly, comprising:
    a drive;
    a gear set coupled with the drive including at least two gears;
    a drive member moved by at least one gear of the gear set;
    an interface member coupled to the gear set and engaged by the drive member so that the interface member rotates in response to rotation of said at least one gear; and
    an output coupled to the interface member wherein in at least one position of the interface member the gear set binds to prevent rotation of said at least one gear and the interface member which prevents backdrive rotation of the output and in at least one position of the interface member backdrive of the output is permitted.

14. The actuator assembly of claim 13 wherein the drive member is moved relative to the interface member during rotation of the interface member, and wherein in at least one position of the drive member relative to the interface member backdrive of the output is prevented and in at least one position of the drive member relative to the interface member backdrive of the output is permitted.

15. The actuator assembly of claim 14 wherein the drive member is eccentrically carried by a gear of the gear set.

16. An actuator assembly, comprising:
    a drive;
    a gear set coupled with the drive;
    an interface member coupled to the gear set; and
    an output coupled to the interface member wherein in at least one position of the interface member the gear set binds to prevent backdrive of the output, wherein the gear set includes a planetary gear set having a ring gear, a sun gear, a carrier and a planet gear carried by the carrier to rotate relative to the carrier about an axis and with the carrier about an axis of the carrier, and wherein the actuator assembly also includes a drive member carried by the planet gear offset from the axis of rotation of the planet gear.

17. The actuator assembly of claim 16 wherein the sun gear is coupled to the drive and the ring gear is fixed against rotation.

18. The actuator assembly of claim 16 wherein the interface member is engageable with the drive member at an area of engagement of the drive member when the area of engagement of the drive member is located the same distance as or further away from the axis of the sun gear as the sun gear pitch radius plus the planet gear pitch diameter, and in this position backdrive of the output is prevented.

19. The actuator assembly of claim 16 wherein the interface member is engageable with the drive member at an area of engagement of the drive member when the area of engagement of the drive member is located closer to the axis of the sun gear than the sun gear pitch radius plus the planet gear pitch diameter, and in this position backdrive of the output is permitted.

20. The actuator assembly of claim 16 wherein the sun gear is held against rotation and the interface member is engageable with the drive member at an area of engagement of the drive member, and when the area of engagement of the drive member is located the same distance as or closer to the axis of rotation of the carrier as the sun gear pitch radius, then backdrive of the output is prevented.

\* \* \* \* \*